US012643053B2

(12) United States Patent
Stevens et al.

(10) Patent No.: US 12,643,053 B2
(45) Date of Patent: Jun. 2, 2026

(54) MOTION PLATFORM APPARATUS AND METHOD OF DISPLACING A PAYLOAD PLATFORM

(71) Applicant: Ansible Motion Limited, Wiltshire (GB)

(72) Inventors: Robert Stevens, East Harling (GB); Kia Cammaerts, Woking (GB)

(73) Assignee: Ansible Motion Limited, Wiltshire (GB)

( * ) Notice: Subject to any disclaimer, the term of this patent is extended or adjusted under 35 U.S.C. 154(b) by 277 days.

(21) Appl. No.: 18/268,410

(22) PCT Filed: Dec. 20, 2021

(86) PCT No.: PCT/EP2021/086710
§ 371 (c)(1),
(2) Date: Jun. 20, 2023

(87) PCT Pub. No.: WO2022/136224
PCT Pub. Date: Jun. 30, 2022

(65) Prior Publication Data
US 2024/0149177 A1 May 9, 2024

(30) Foreign Application Priority Data
Dec. 24, 2020 (GB) ...................................... 2020605

(51) Int. Cl.
*A63G 31/16* (2006.01)
*A63G 31/02* (2006.01)
(Continued)

(52) U.S. Cl.
CPC ............. *A63G 31/16* (2013.01); *A63G 31/02* (2013.01); *G09B 9/04* (2013.01); *G09B 9/12* (2013.01)

(58) Field of Classification Search
CPC ........................................................ G09B 9/12
(Continued)

(56) References Cited

U.S. PATENT DOCUMENTS 3,304,628 A 2/1967 Kaplan
3,794,283 A * 2/1974 Furno .................. B23Q 1/5481
248/278.1
(Continued)

FOREIGN PATENT DOCUMENTS

CN 105939765 A 9/2016
CN 108137291 A 6/2018
(Continued)

OTHER PUBLICATIONS

International Search Report and Written Opinion mailed Apr. 19, 2022 for PCT Appl. No. PCT/EP2021/086711, 14 pages.
(Continued)

*Primary Examiner* — Thomas M Sember
(74) *Attorney, Agent, or Firm* — Sterne, Kessler, Goldstein & Fox P.L.L.C.

(57) ABSTRACT
A motion platform apparatus (100) for vehicle simulation comprises a payload platform (134) having peripheral elevation sites (136, 138, 140). The apparatus (100) also comprises a base stage (102) having peripheral anchoring sites, and linkages (110, 112, 114) configured to couple the peripheral anchoring sites to the peripheral elevation sites (136, 138, 140) respectively, the linkages (110, 112, 114) comprising a first linkage (110). The first linkage (110) comprises a first arm (116) operably coupled at a first end thereof by a spherical joint (128) to a second arm (122) at a first end thereof. The first arm (116) is operably coupled at a second end thereof to an anchoring site of the peripheral anchoring sites by a first revolute joint (132). The second arm (122) is operably coupled at a second end thereof to an
(Continued)

elevation site (136) of the peripheral elevation sites (136, 138, 140) by a second revolute joint (146).

15 Claims, 9 Drawing Sheets

(51) Int. Cl.
    *G09B 9/04*         (2006.01)
    *G09B 9/12*         (2006.01)

(58) Field of Classification Search
    USPC ...................................... 472/59, 130; 434/55
    See application file for complete search history.

(56) References Cited

U.S. PATENT DOCUMENTS

| | | | |
|---|---|---|---|
| 4,651,589 | A | 3/1987 | Lambert |
| 5,366,375 | A | 11/1994 | Sarnicola |
| 5,752,834 | A | 5/1998 | Ling |
| 6,431,987 | B1 * | 8/2002 | Tushar .................... F16C 11/06 |
| | | | 403/114 |
| 9,466,223 | B2 | 10/2016 | Stevens et al. |
| 9,829,149 | B2 | 11/2017 | Jennings |
| 11,830,382 | B2 | 11/2023 | Liberatore et al. |
| 2005/0091018 | A1 | 4/2005 | Craft |
| 2012/0282588 | A1 | 11/2012 | Stevens et al. |
| 2014/0157916 | A1 | 6/2014 | Vatcher et al. |
| 2014/0188279 | A1 | 7/2014 | Lee et al. |
| 2015/0354747 | A1 | 12/2015 | Jennings |
| 2017/0072327 | A1 | 3/2017 | Wach |
| 2019/0089871 | A1 | 3/2019 | Pan et al. |
| 2022/0215771 | A1 | 7/2022 | Warne et al. |
| 2022/0219093 | A1 * | 7/2022 | Ouyang ................. A63G 31/16 |
| 2024/0078927 | A1 | 3/2024 | Stevens et al. |

FOREIGN PATENT DOCUMENTS

| | | | |
|---|---|---|---|
| EP | 1190926 | A2 | 3/2002 |
| EP | 2486558 | B8 | 10/2013 |
| GB | 1080074 | A | 8/1967 |
| GB | 1286028 | A | 8/1972 |
| GB | 2567174 | A | 4/2019 |
| JP | 2004082223 | A | 3/2004 |
| JP | 2008212651 | A | 9/2008 |
| WO | 0138767 | A2 | 5/2001 |
| WO | 2007088314 | A2 | 8/2007 |
| WO | 2010068089 | A1 | 6/2010 |

OTHER PUBLICATIONS

Anonymous: "Motion Platform PS-3TM-1000PS-3TM-1000," Oct. 31, 2020 (Oct. 31, 2020), pp. 1-2, XP055910175, Retrieved from the Internet: URL: https://motionsystems.eu/wp/wp-content /uploads/ 2020/10/MotionSystems_ProductCard_PS-3TM-1000.pdf [retrieved on Apr. 7, 2022].

Combined Search and Examination Report, dated Jun. 18, 2021 for Application No. GB 2020606.6, 6 pages.

International Search Report and Written Opinion mailed Apr. 7, 2022 for PCT Appl. No. PCT/EP2021/086710, 11 pages.

Search Report, dated Jun. 20, 2021, for Application No. GB 2020605.8, 4 pages.

English Translation of Notice of Reasons for Rejection mailed Aug. 26, 2025 in related Japanese Application No. 2023-532653; 4 pages.

Non-Final Office Action mailed Oct. 2, 2025 in U.S. Appl. No. 18/268,514; 9 pages.

* cited by examiner

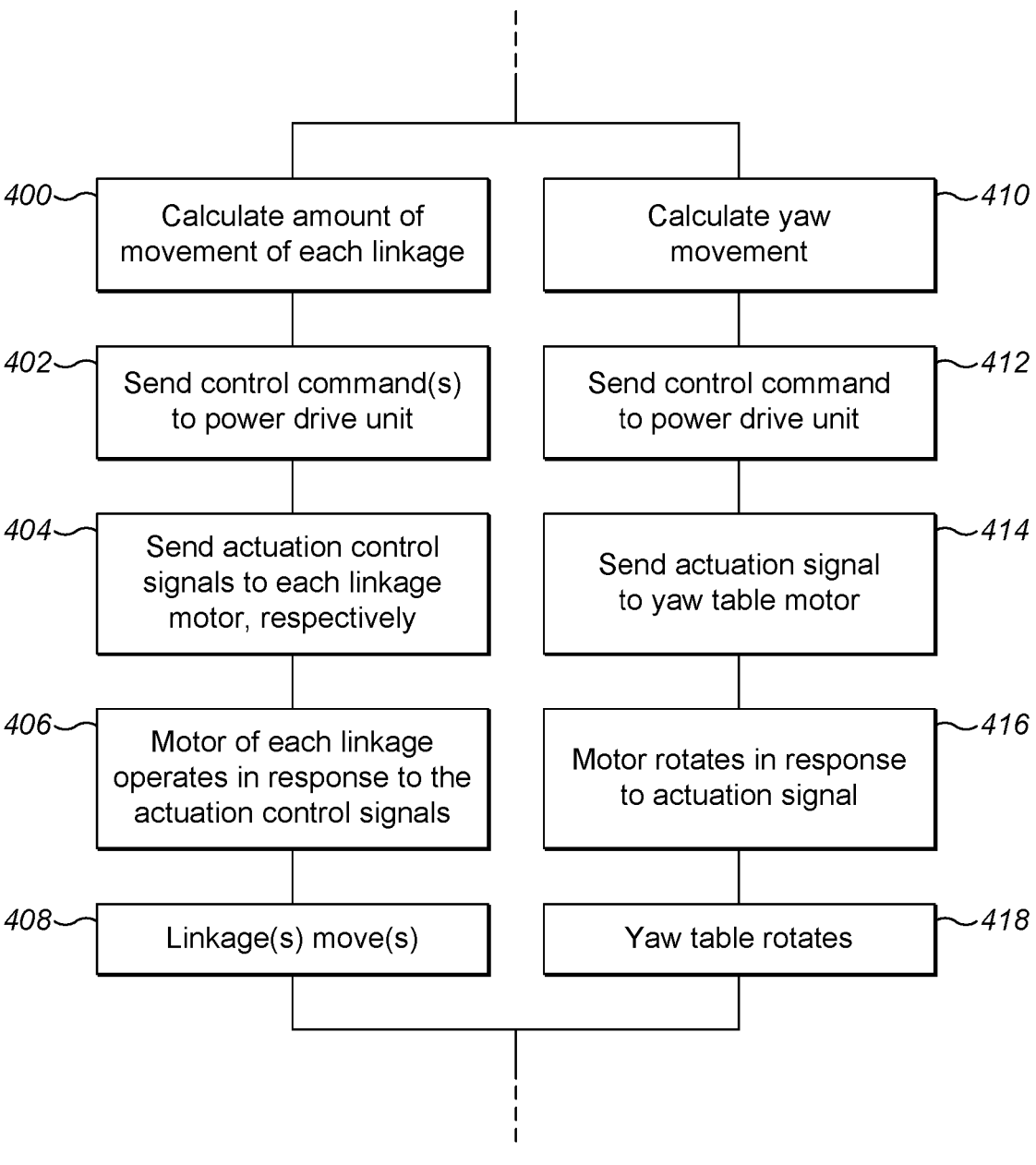

400～ Calculate amount of movement of each linkage

410～ Calculate yaw movement

402～ Send control command(s) to power drive unit

412～ Send control command to power drive unit

404～ Send actuation control signals to each linkage motor, respectively

414～ Send actuation signal to yaw table motor

406～ Motor of each linkage operates in response to the actuation control signals 416～ Motor rotates in response to actuation signal 408～ Linkage(s) move(s)

418～ Yaw table rotates

*FIG. 6*

MOTION PLATFORM APPARATUS AND METHOD OF DISPLACING A PAYLOAD PLATFORM

The present invention relates to a motion platform apparatus, of the type that, for example, is capable of movement in three degrees of freedom. The present invention also relates to a method of displacing a payload platform, the method being of the type that, for example, is capable of moving the payload platform in three degrees of freedom.

In the field of motion platforms, as well as others, degrees of freedom are typically referred to as surge, roll, sway, pitch, heave and yaw. Surge is translation along an axis aligned forwards and backwards, roll is rotation about the surge axis, sway is translation along an axis aligned from side to side, pitch is rotation about the sway axis, heave is translation along an axis aligned up and down, and yaw is rotation about the heave axis.

Various architectures are known to provide three degrees of freedom of motion, which are usually heave, pitch and roll mentioned above. It is known to elevate peripheral elevation sites of a payload platform above a base plane by way of a plurality of linkages, each employing a pair of crank members or a single crank member respectively coupled at first ends thereof to the base via an anchored drive motor and at a second end thereof to tip ends of a wishbone member by a revolute joint. A neck end of the wishbone member is coupled to a peripheral elevation site of the peripheral elevation sites. An example of such a motion platform arrangement is a PS-3TM-1000 motion platform available from Motion Systems Michał Stanek, Poland.

However, such arrangements are not efficient in terms of stiffness per unit mass when subjected to yaw torques, because the crank and wishbone members are subjected to torsion that tends to distort the cranks. In this regard, stiffness is desirable to reduce unwanted distortion of such linkages, which reduces the positional accuracy of the payload platform. Also, at certain resonant frequencies, the movement of the cranks with respect to the wishbone member is out of phase owing to a lack of stiffness, thereby reducing the positional accuracy of the payload platform. Yaw stiffness is therefore desirable to mitigate the above-described problems. The requirement for stiffness is increased when the motion platform and a yaw table upon which the motion platform is mounted is further mounted on a surge and sway translation stage owing to the tendency for surge and sway acceleration to introduce additional yaw torques on the motion platform.

In order to counteract the effects of torsion on the linkage, it is known to increase the size of existing elements of motion platform arrangements. However, this increases mass which increases cost and reduces dynamic performance. It is also known to add additional mechanism elements to the motion platform arrangement. However, such measures are supplementary, thereby increasing mass, motion complexity, inventory and therefore cost of the motion platform arrangement.

According to a first aspect of the present invention, there is provided a motion platform apparatus for vehicle simulation, the apparatus comprising: a payload platform having peripheral elevation sites; a base stage having peripheral anchoring sites; and linkages configured to couple the peripheral anchoring sites to the peripheral elevation sites respectively, the linkages comprising a first linkage; wherein the first linkage comprises a first arm operably coupled at a first end thereof by a spherical joint to a second arm at a first end thereof; the first arm is operably coupled at a second end thereof to an anchoring site of the peripheral anchoring sites by a first revolute joint; and the second arm is operably coupled at a second end thereof to an elevation site of the peripheral elevation sites by a second revolute joint.

The first arm may be a first fork. The spherical joint may be a ball joint. The second arm may be a second fork.

The first fork may be operably coupled to the second fork at respective neck ends thereof.

The first fork may be a first wishbone and the second fork may be a second wishbone.

The first linkage may be configured to elevate selectively the elevation site.

The apparatus may further comprise: an actuator configured to move the first linkage over a range of extension. The actuator may be operably coupled to the tip end of the first fork.

The actuator may be an electric motor. The apparatus may further comprise a gearbox; the actuator may be operably coupled to the first linkage by the gearbox.

The linkages may further comprise: a second linkage comprising a third arm operably coupled at a first end thereof to a fourth arm at a first end thereof; the third arm may be operably coupled at a second end thereof to another anchoring site of the peripheral anchoring sites; and the fourth arm may be operably coupled at a second end thereof to another elevation site of the peripheral elevation sites.

The linkages may further comprise: a third linkage comprising a fifth arm operably coupled at a first end thereof to a sixth arm at a first end thereof; the fifth arm may be operably coupled at a second end thereof to a further anchoring site of the peripheral anchoring sites; and the sixth arm may be operably coupled at a second end thereof to a further elevation site of the peripheral elevation sites.

The first, second and third linkages may be independently controllable. The first, second and third linkages may be configured to control roll, pitch and/or heave applicable to a payload when disposed on the payload platform.

The apparatus may further comprise: a turntable comprising the base stage.

The apparatus may further comprise: a translation stage linearly translatable in two substantially perpendicular directions; the motion platform apparatus may be operably coupled to the translation stage.

According to a second aspect of the present invention, there is provided a vehicle simulator system, the system comprising the motion platform apparatus as set forth above in relation to the first aspect of the present invention.

The system may further comprise a payload, for example a vehicle cockpit, disposed upon the payload platform.

The system may further comprise: a display disposed within a field of view; and a processing resource operably coupled to the display and the motion platform apparatus; wherein the processing resource may control operation of the motion platform apparatus, thereby simulating a performance aspect of a vehicle.

According to a third aspect of the present invention, there is provided a method of displacing a payload platform for a vehicle simulator, the method comprising: coupling a first end of a first arm to a first end of a second arm by a spherical joint; coupling a second end of the first arm to a peripheral anchoring site of peripheral anchoring sites of a base stage by a first revolute joint; coupling a second end of the second arm to a peripheral elevation site of peripheral elevation sites of the payload platform by a second revolute joint; selectively actuating the coupled first and second arms to elevate the peripheral anchoring site.

According to a fourth aspect of the present invention, there is provided a control arm drive apparatus comprising: an electric motor comprising an output shaft; a gearbox arrangement comprising a first gearbox disposed in spaced relation to a second gearbox; wherein the first gearbox comprises a first torque input and a first outwardly facing torque output disposed opposite the first torque input; the second gearbox comprises a second torque input and a second outwardly facing torque output disposed opposite the second torque input; the first and second torque inputs are coaxial and coupled together by a drive shaft; and the output shaft of the electric motor is operably coupled to the drive shaft.

The electric motor may be configured to rotate, when in use, the drive shaft.

A first longitudinal axis of the output shaft of the electric motor may be disposed in parallel with a second longitudinal axis of the drive shaft; the output shaft may be disposed opposite the drive shaft in overlapping relation.

The drive shaft may be operably coupled to the output shaft by a drive belt.

The output shaft may carry a first pulley and the drive shaft may carry a second pulley; the drive belt may be configured to engage the first and second pulleys.

The electric motor may be offset with respect to the drive shaft.

According to a fifth aspect of the present invention, there is provided a yaw table apparatus for a motion platform, the apparatus comprising: a nonrotatable stage; a base stage disposed opposite the nonrotatable stage, the base stage being rotatable relative to the nonrotatable stage; and a drive arrangement having a housing and an output surface; wherein the base stage comprises a central aperture and the drive arrangement extends through the central aperture of the base stage; the output surface of the drive arrangement is secured to the nonrotatable stage; and the housing of the drive stage is secured to the base stage.

The base stage may be maintained in spaced relation to the nonrotatable stage by a peripheral side wall extending from the nonrotatable stage towards the base stage.

The apparatus may further comprise a complementary peripheral bearing arrangement comprising a first part carried by the base stage opposite a second part carried by the nonrotatable stage.

The second part of the complementary peripheral bearing arrangement may be carried by the peripheral side wall.

The drive arrangement may comprise an electric motor operably coupled to a gearbox; the gearbox may comprise the output surface.

The gearbox may comprise an outer housing; the outer housing of the gearbox may be secured to the base stage.

The nonrotatable stage may be disposed beneath the base stage.

The base stage may have an axis of rotation; a centre of the nonrotatable stage may be coaxial with the rotatable axis of the base stage.

The complementary peripheral bearing arrangement may be substantially circular.

The housing of the drive arrangement may be configured to rotate, when in use, in response to an input control signal while the output surface and the nonrotating stage remain substantially static.

According to a sixth aspect of the present invention, there is provided a yaw table apparatus for a motion platform, the apparatus comprising: a nonrotatable stage; a base stage disposed opposite the nonrotatable stage, the base stage being rotatable relative to the nonrotatable stage; and a drive arrangement having a housing; wherein the drive arrangement is configured so that, when in use, rotary motion of the housing rotates the base stage.

According to a seventh aspect of the present invention, there is provided a motion platform apparatus comprising: the yaw table apparatus as set forth above in relation to the first or second aspects of the present invention; wherein the base stage is configured to carry a payload platform having peripheral elevation sites, the base stage being operably coupled to the payload platform by actuatable peripheral linkages extending between lower peripheral anchoring sites of the base stage and the peripheral elevation sites of the payload platform.

It is thus possible to provide an apparatus and method capable of obviating or at least mitigating the effects of torsion between the base plane and payload platform, for example stressing of the linkages, when the apparatus experiences high torque yaw movements. The apparatus and method also provide improved positional accuracy and improved high frequency movement control, particularly but not exclusively under yaw conditions that result in deflection or resonance of the linkages. The apparatus and method obviate the need for supplementary measures to be implemented to reduce the effects of torsion, thereby reducing the bill of materials and the overall mass of the apparatus, and the assembly time and complexity of the apparatus.

At least one embodiment of the invention will now be described, by way of example only, with reference to the accompanying drawings, in which:

FIG. 6 is a flow diagram of a part of the flow diagram of FIG. 5 in greater detail;

Throughout the following description, identical reference numerals will be used to identify like parts.

Figure 1:
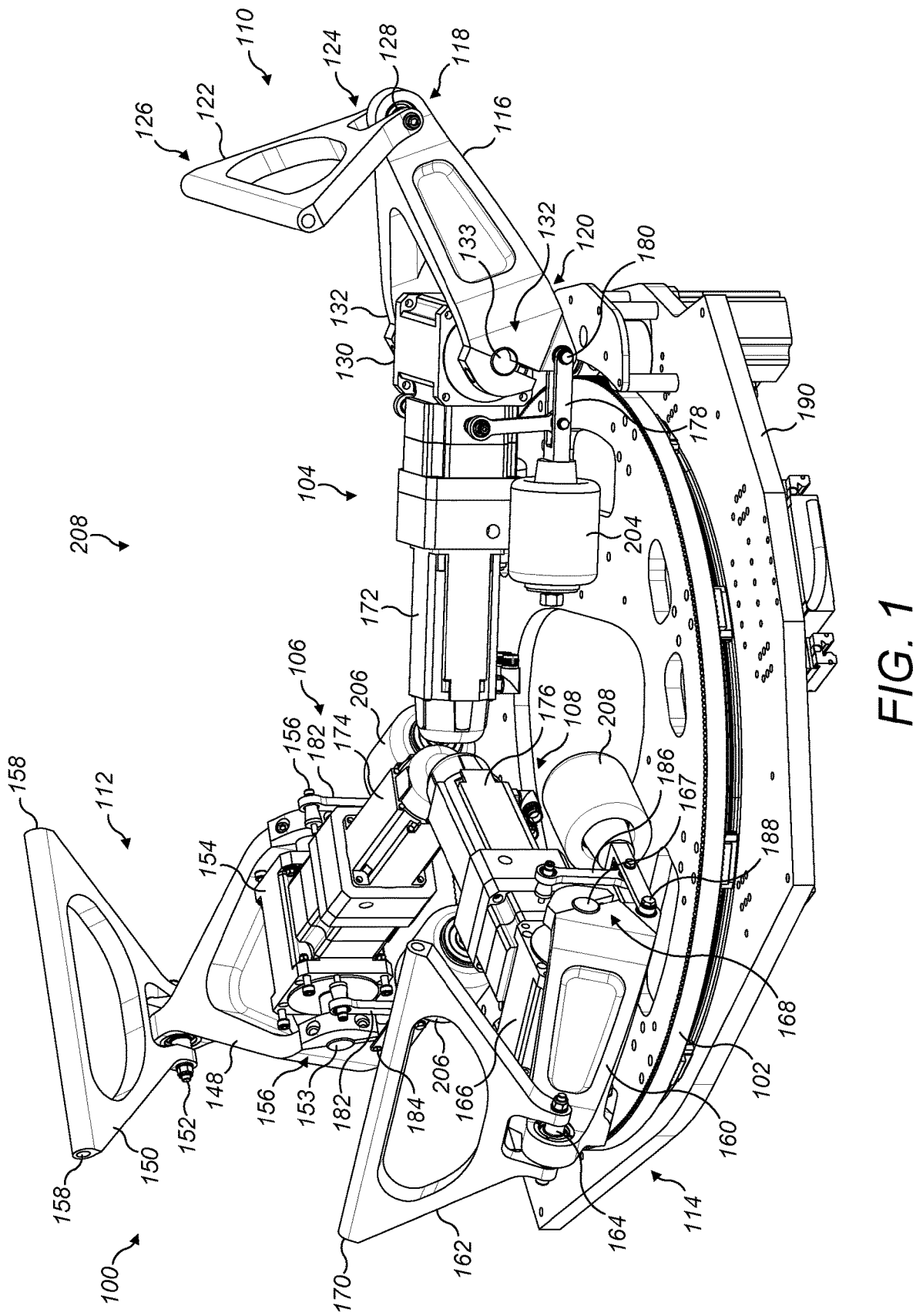
FIG. 1 is a first perspective view of a motion and gearbox layout of a motion platform apparatus constituting an embodiment of the invention.

Referring to FIG. 1, a motion platform apparatus 100 comprises a base stage 102 carrying a first drive system 104, a second drive system 106 and a third drive system 108 radially arranged on the base stage 102 and fixedly attached to the base stage 102. The motion platform apparatus 100 also comprises a first linkage 110, a second linkage 112 and a third linkage 114. The first linkage 110 comprises a first arm 116 having a first end 118 and a second end 120. The first linkage 110 also comprises a second arm 122 having a first end 124 and a second end 126. The first arm 116 is operably coupled at the first end 118 thereof to the second arm 122 at the first end thereof 124 by a first spherical joint 128. A first gearbox 130 of the first drive system 104 is disposed upon and fixed to the base stage 102, the first arm 116 being operably coupled at the second end 120 thereof to the first gearbox 130 by a first revolute joint 132 formed with a first output shaft 133 of the first gearbox 130. The first gearbox 130 provides a first anchoring site on the base stage 102.

Figure 2:
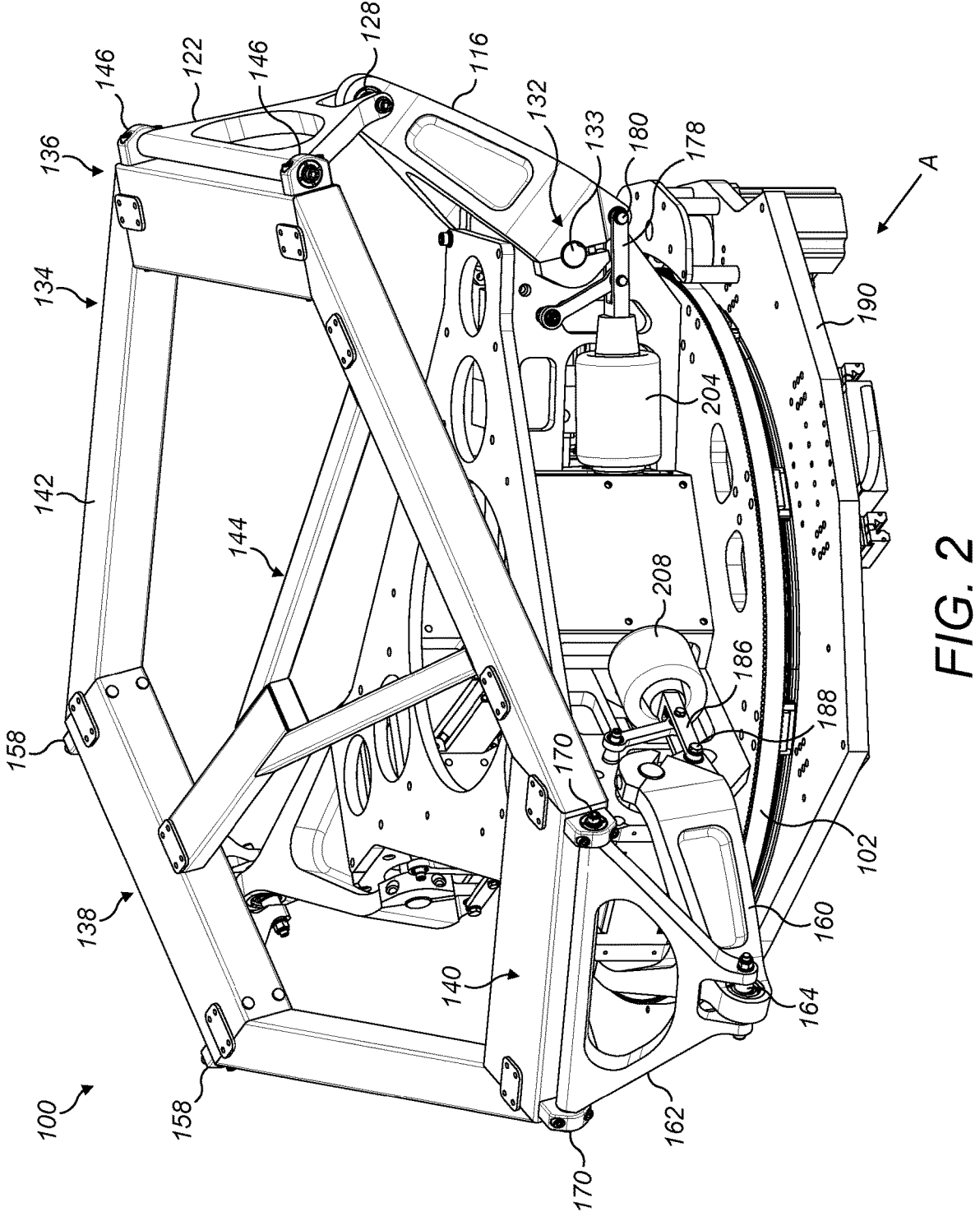
FIG. 2 is a second perspective view of the motion platform apparatus of FIG. 1 including a payload platform.
Figure 3:
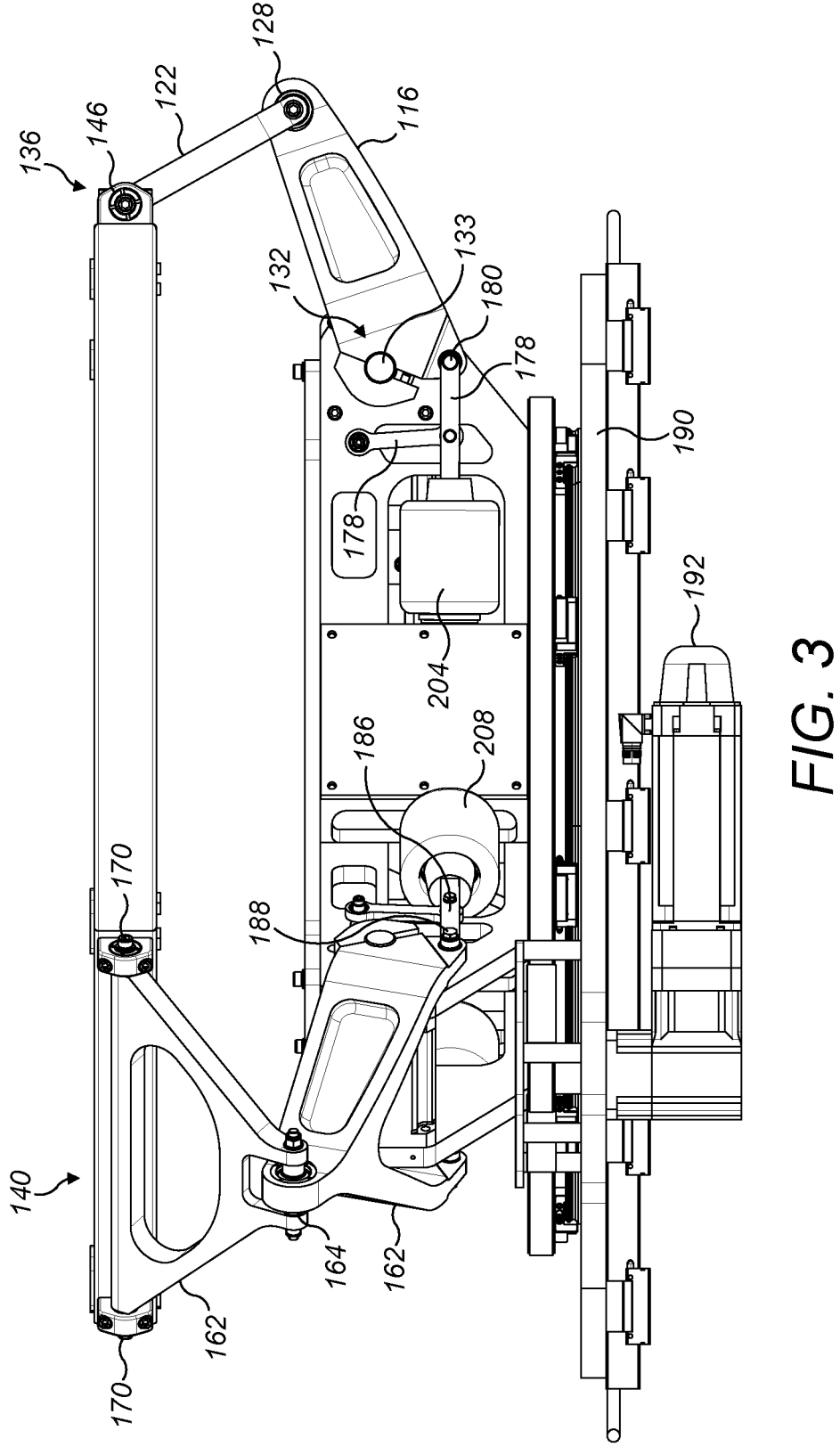
FIG. 3 is a side elevation of the motion platform apparatus of FIG. 2 from direction A.

Referring to FIGS. 2 and 3, the motion platform apparatus 100 further comprises a payload platform 134 having a first peripheral elevation site 136, a second peripheral elevation site 138 and a third peripheral elevation site 140. In this example, the payload platform 134 has a hexagonal periphery and is planar. The payload platform 134 is formed, in this example, by interconnected peripheral tubular members 142 and a Y-shaped cross-member 144 for support. Of course, the skilled person will appreciate that the payload platform 134 can be constructed in a number of different ways and alternatives to the peripheral tubular members 142 and/or the Y-shaped cross-member 144, for example a plate, can be employed. The second arm 122 is operably coupled at the second end 126 thereof to the first peripheral elevation site 136 of the payload platform 134 by a second revolute joint 146.

Referring back to FIG. 1, the second linkage 112 comprises a first arm 148 having first and second ends, and a second arm 150 having first and second ends. The first arm 148 is operably coupled at the first end thereof to the second arm 150 at the first end thereof by a second spherical joint 152. A second gearbox 154 of the second drive system 106 is disposed upon and fixed to the base stage 102, the first arm 148 being operably coupled at the second end thereof to the second gearbox 154 by a third revolute joint 156 formed with a second output shaft 153 of the second gearbox 154. The second gearbox 154 provides a second anchoring site on the base stage 102. Referring to FIG. 2, the second arm 150 is operably coupled at the second end thereof to the second peripheral elevation site 138 of the payload platform 134 by a fourth revolute joint 158.

Referring back to FIG. 1, the third linkage 114 comprises a first arm 160 having first and second ends, and a second arm 162 having first and second ends. The first arm 160 is operably coupled at the first end thereof to the second arm 162 at the first end thereof by a third spherical joint 164. A third gearbox 166 of the third drive system 106 is disposed upon and fixed to the base stage 102, the first arm 160 being operably coupled at the second end thereof to the third gearbox 166 by a fifth revolute joint 168 formed with a third output shaft 167 of the third gearbox 166. The third gearbox 166 provides a third anchoring site for the base stage 102. Referring to FIGS. 2 and 3, the second arm 162 is operably coupled at the second end thereof to the third peripheral elevation site 140 of the payload platform 134 by a sixth revolute joint 170.

In this example, the first arms 116, 148, 160 are respectively first wishbones and the second arms 122, 150, 162 are respectively second wishbones. The first and second wishbones respectively constitute first and second forks. The first forks each have a tip end 120, and a neck end 118. Likewise the second forks also each have a tip end 126 and a neck end 124. In this example, the first and second forks are respectively coupled to each other at the neck ends 118, 124 thereof. The tip ends 120 of the first forks are respectively coupled to the first, second and third peripheral anchoring sites, and the tip ends 126 of the second forks are respectively coupled to the first, second and third peripheral elevation sites 136, 138, 140.

As the skilled person will appreciate, various designs of spherical joint exist. In this example, the first, second and third spherical joints 128, 152, 164 are first, second and third ball joints, respectively. However, use of other designs of spherical joint is contemplated.

Turning to FIG. 1, the first drive system 104 comprises a first motor, for example a first electric motor 172, operably coupled to the first gearbox 130. The second drive system 106 comprises a second motor, for example a second electric motor 174, operably coupled to the second gearbox 154. The third drive system 108 comprises a third motor, for example a third electric motor 176, operably coupled to the third gearbox 166. The first, second and third motors 172, 174, 176 respectively constitute first, second and third actuators.

Figure 9:
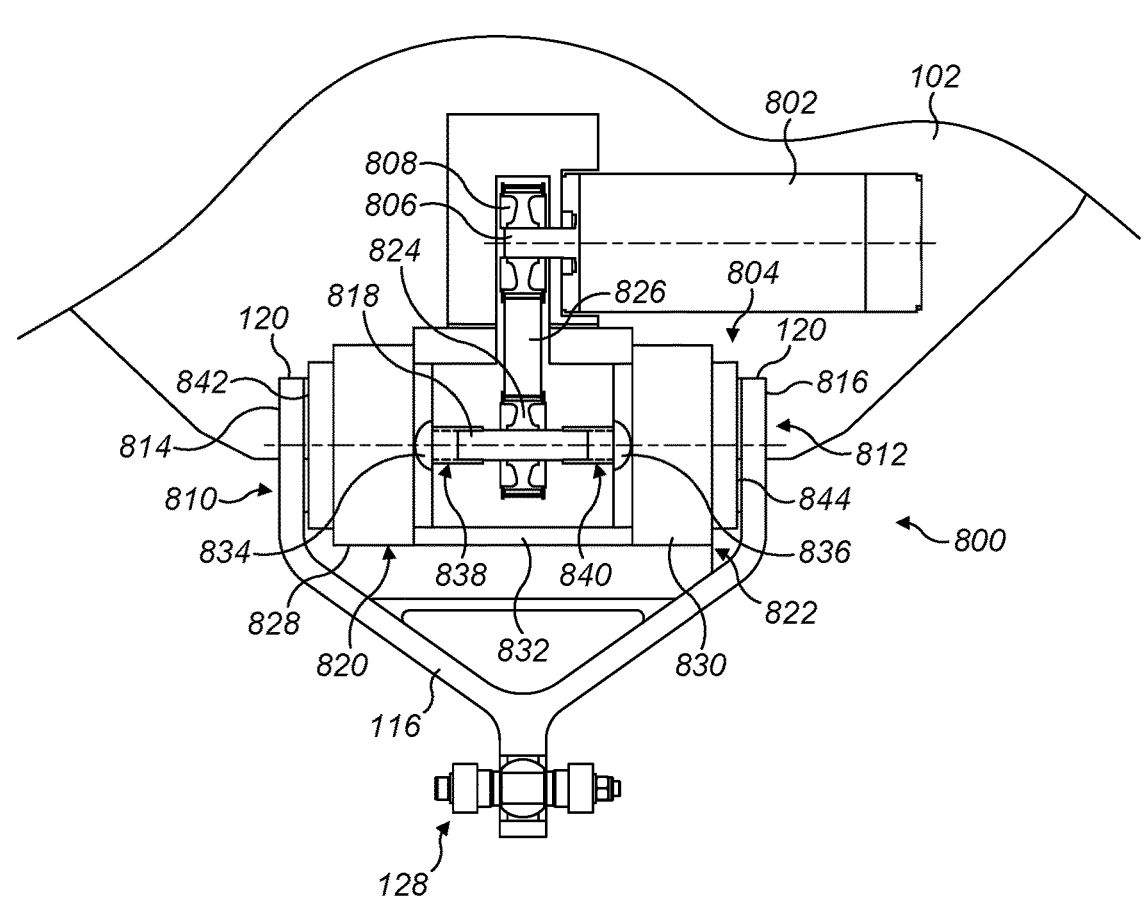
FIG. 9 is a schematic diagram of an alternative drive system to the drive systems of FIGS. 1, 2 and 3.

In another embodiment (FIG. 9), an alternative drive system configuration to the configuration of the first, second and third drive systems 104, 106, 108 described above can be employed. For the sake of simplicity and conciseness of description only one of the alternative drive system configurations will be described. However, the skilled person should appreciate that the same drive configuration is, in this example, employed as the second and third drive systems 106, 108. In this example, the alternative configuration of the first drive system 104 will therefore be described.

As in the previous example, a first alternative drive system 800 constituting the alternative to the first drive system 104 is radially arranged on the base stage 102 and fixedly attached to the base stage 102 in a manner to be described later herein. The first alternative drive system 800 comprises an offset electric motor 802 operably coupled to a paired gearbox arrangement 804. The offset motor 802 comprises a motor output shaft 806 carrying a first pulley 808. The paired gearbox arrangement 804 is disposed between the tip ends 120 of the first lower control arm 116. The tip ends 120 comprise a first side end 810 and a second side end 812, the first side end 810 comprising one or more first connecting points 814 and the second side end 812 comprising one or more second connecting points 816. The paired gearbox arrangement 804 comprises a drive shaft 818 that extends between a first side gearbox 820 located at the first side end 810 and a second side gearbox 822 located at the second end 812. The drive shaft 818 of the paired gearbox arrangement 804 carries a second pulley 824, the first pulley 808 being coupled to the second pulley 824 by a drive belt 826, which thus engages the first and second pulleys 808, 824. It should therefore be appreciated that a first longitudinal axis of the motor output shaft 806 is disposed in parallel with a second longitudinal axis of the drive shaft 818 and the motor output shaft 806 is disposed opposite the drive shaft 818 in overlapping relation. The offset motor 802 is offset with respect to the drive shaft 818.

The first side gearbox 820 comprises a first housing 828 and the second side gearbox 822 comprises a second housing 830. A central mounting structure 832 is fixed to the base stage 102, the first and second side gearboxes 820, 822 being mounted to the central mounting structure 832. The central mounting structure 832 also houses the drive belt 826 and supports the offset motor 802, and serves to transfer loads between the first lower control arm 116 to the base stage 102.

The first side gearbox 820 comprises a first gearbox input shaft 834, constituting a first torque input, and the second side gearbox 822 comprises a second gearbox input shaft 836, constituting a second torque input. The first and second gearbox input shafts 834, 836 respectively comprise first and second coaxial apertures for receiving a first end 838 and a second end 840 of the drive shaft 818, which extends coaxially with the first and second gearbox input shafts 834,

836. The second pulley 824 is located centrally between the first and second gearbox input shafts 834, 836. The paired gearbox arrangement 804 also comprises a first output flange 842, constituting a first outwardly facing torque output, at the first side end 810 and a second output flange 844, constituting a second outwardly facing torque output, at the second side end 812. The first output flange 842 is coupled to the first connecting points 814 of the first lower control arm 116 and the second output flange 844 is coupled to the second connecting points 816 of the first lower control arm 116 such that an axis of rotation of the tip ends 120 of the first lower control arm 116 are coaxial with central axes of the first and second output flanges 842, 844.

The torque required to transfer the loads between the first lower control arm 116 and the base stage 102 requires, in this example, the paired gearbox arrangement 804 to provide a high reduction gear ratio. The paired gearbox arrangement 804 is mechanically optimised to minimise mass, maximise stiffness and minimise volume as well as deliver the same input torque to both the first and second side ends 810, 812 of the first lower control arm 116.

In operation, in order to rotate the first lower control arm 116 relative to the base stage 102, the offset motor 802 is activated, causing the motor output shaft 806 and hence the first pulley 808 to rotate. The first pulley 808 therefore drives the second pulley 824 using the drive belt 826. The second pulley 824 rotates the drive shaft 818 and therefore the first and second gearbox input shafts 834, 836 coupled to the drive shaft 818. The first and second output flanges 842, 844 then rotate in response to rotation of the first and second gearbox input shafts 834, 836, but at a slower rate of rotation owing to the above-mentioned gearing ratio. Rotation of the first and second output flanges 842, 844 respectively coupled to the first and second side ends 810, 812 of the first lower control arm 116 serves to rotate the first lower control arm 116 up or down which raises or lowers the spherical joint 128.

The use of the first and second side gearboxes 820, 822 permits substantially half the torque to be applied to each of the first and second side ends 810, 812 as compared with use of a single gearbox mounted to one side of the first lower control arm 116. Rotational inertia in yaw is thus reduced as compared with other mechanical arrangements having the same total torque transmission ability. Furthermore, coupling the drive belt 826 on a low torque side of the first and second side gearboxes 820, 822 optimises the stiffness of the motion platform apparatus 100 by reducing elongation of the drive belt.

Referring to FIG. 3, the base stage 102 is, in the above examples, rotatably mounted upon a motion stage platform 190 and constitutes a turntable. The base stage 102 is driven by a motor and gearbox arrangement, constituting a yaw table motor and gearbox unit 192, via a circumferential drive belt (not shown). The ability to rotate the base stage 102 and hence the payload platform 134 is optional and depends upon the implementation employed. In another example, the base stage 102, and optionally if provided the motion stage platform 190, is mounted on a translation stage system that is linearly translatable in two substantially perpendicular directions, for example a surge-sway motion stage system (not shown), to provide surge or sway motion of the payload platform 134. The surge-sway motion stage system can be any suitable configuration to translate the payload platform 134 and/or base stage 102 along surge or sway axes. However, the provision of the surge-sway motion stage system is not central to understanding the examples set forth herein and so will not be described in further detail.

Figure 10:
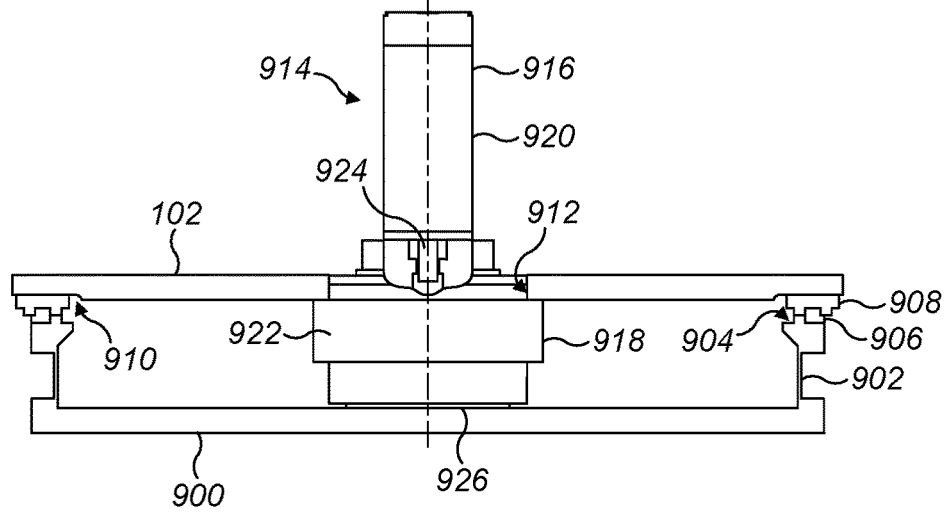
FIG. 10 is a schematic diagram of a yaw table drive system.

In a further embodiment, another driving mechanism for the base stage 102, and alternative to the motor and gearbox unit/drive belt arrangement of the previous examples, is employed. Referring to FIG. 10, the motion stage platform 190 is a non-rotatable lower stage 900, for example a substantially circular stage, although other shaped stages can be employed, comprising an upstanding peripheral wall 902 extending substantially perpendicularly away from the lower stage 900 towards the base stage 102. The peripheral side wall 902, for example a circumferential side wall, comprises a first opposing surface 904 carrying a circumferential bearing rail 906. The base stage 102 is rotary and disposed opposite the lower stage 900 in spaced relation thereto. The base stage 102 comprises a circumferential bearing carriage 908 on an underside of the base stage 102, constituting a second opposing surface 910. The circumferential bearing carriage 908 cooperates with the circumferential bearing rail 906, and constitutes a complementary peripheral bearing arrangement, in order to facilitate low friction rotational motion of the rotary base stage 102 when in use. The rotary base stage 102 comprises a central aperture 912 therethrough for receiving a yaw drive arrangement 914. In this example, the yaw drive arrangement 914 comprises a centrally mounted motor 916 operably coupled to a centrally mounted gearbox 918, the centrally mounted motor 916 having a motor housing 920 and the centrally mounted gearbox 918 having a gearbox housing 922. The centrally mounted motor 916 comprises an output shaft 924 operably coupled to an input shaft (not shown) of the centrally mounted gearbox 918. The centrally mounted gearbox 918 comprises a gearbox output flange or surface 926. The gearbox output flange 926 is centrally mounted and fixedly secured to the lower stage 900 and the gearbox housing 922 is fixedly secured to the base stage 102. The base stage 102 comprises an axis of rotation that is coaxial with a centre of the lower stage 900.

In this example, the base stage 102 is as described in relation to previous examples and is configured to carry the first linkage 110, the second linkage 112 and the third linkage 114. However, it should be appreciated that in other embodiments, other linkage configurations can be employed as opposed to the linkage configuration described herein comprising a specific combination of revolute and spherical joints.

In operation, when driven, the output shaft 924 of the centrally mounted motor 916 rotates in response to an input control signal. As the gearbox output flange 926 is secured to the lower stage and is not free to rotate, the motor housing 920 and the gearbox housing 922, which are secured to the rotary base stage 102 that is free to rotate as facilitated by the circumferential bearing rail and carriage 906,908, all rotate together relative to the lower stage 900. Owing to the more direct drive path between the centrally mounted motor 916 and the base stage 102, as compared with previously described examples, yaw torques can be applied by the centrally mounted motor 916 to the base stage 102 with improved stiffness.

In the above example, the peripheral side wall 902 extends away from the lower stage 900 to provide a space between the lower stage 900 and the base stage 102, which can conveniently be used to locate electrical cabling and the like. However, the provision of the peripheral side wall 902 is optional and the circumferential bearing rail 906 can be secured to the periphery of the lower stage 900 where such additional space between the lower stage 900 and the base stage 102 is not required.

As in previous examples, the lower stage 900 can optionally be mounted on a translation stage system that is linearly translatable in two substantially perpendicular directions in order to provide surge or sway.

Figure 4:
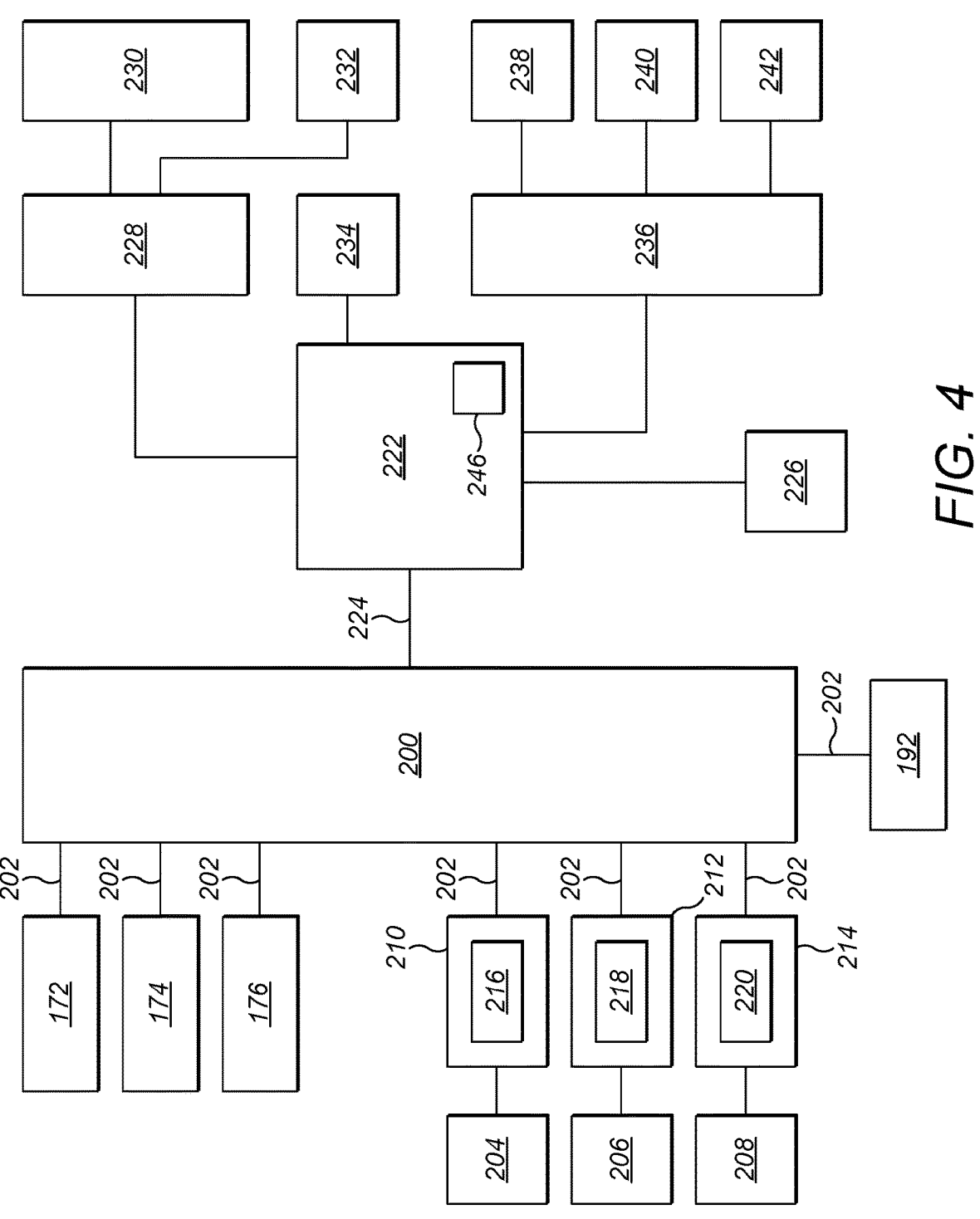
FIG. 4 is a schematic diagram of a control system for the apparatus of FIGS. 1 to 3.

Referring to FIG. 4, the first motor 172 is, in this example operably coupled to a first output of a power drive unit 200 via a wiring loom 202. Similarly, the second and third motors 174, 176 are operably coupled to a second output and a third output of the power drive unit 200, respectively, via the wiring loom 202. When implemented for rotational motion about a heave-axis (yaw), the yaw table motor and gearbox unit 192, for example, is operably coupled to the power drive unit 200 via the wiring loom 202.

Referring to FIGS. 1 and 4, the motion platform apparatus 100 comprises, in this example, a first pair of configurable pneumatic supports 204 operably coupled to the first lower control arm 116 via a first pair of four-bar linkage arrangements 178 respectively at either side of the first gearbox 130. Each four-bar linkage arrangement of the first pair of four-bar linkage arrangements 178 is respectively coupled to a first hinge joint 180 of the first lower control arm 116, which is disposed off-center relative to the first revolute joint 132. The motion platform apparatus 100 also comprises a second pair of configurable pneumatic supports 206 and a third pair of configurable pneumatic supports 208. The second pair of pneumatic supports 206 is coupled to the second lower control arm 148 via a second pair of four-bar linkage arrangements 182 respectively at either side of the second gearbox 154. Each four-bar linkage arrangement of the second pair of four-bar linkage arrangements 182 is coupled to a second hinge joint 184 of the second lower control arm 148, which is disposed off-center relative to the third revolute joint 156. The third pair of pneumatic supports 208 is coupled to the third lower control arm 160 via a third pair of four-bar linkage arrangement 186 respectively at either side of the third gearbox 166. Each four-bar linkage arrangement of the third pair of four-bar linkage arrangements 186 is coupled to a third hinge joint 188 of the third lower control arm 160, which is disposed off-center relative to the fifth revolute joint 168.

The first, second and third linkages 110, 112, 114 each comprise a base stage end and a payload platform end distal from the base stage end, the first, second and third pneumatic supports 204, 206, 208 being respectively coupled to the first, second and third linkages 110, 112, 114, at the base stage ends of the first, second and third linkages 110, 112, 114.

Although the first, second and third pneumatic supports 204, 206, 208 described herein are pairs of pneumatic supports, the skilled person should appreciate that one or more of the first, second and third pneumatic supports 204, 206, 208 can be single pneumatic supports operably coupled to the respective first, second or third lower control arms 116, 148, 182 via respective pairs of four-bar linkage arrangements 178, 182, 186, for example at one side of the first, second and third gearboxes 130, 154, 166, respectively. Indeed, it should also be appreciated that although four-bar linkage arrangements are described herein, other linkage configurations can be employed. In this example, the first, second and third pneumatic supports 204, 206, 208 are spaced about the motion platform apparatus 100 and, although coupled thereto, are separate from the first, second and third linkages 110, 112, 114.

It should also be appreciated that in some examples the use of the first, second and third pneumatic supports 204, 206, 208 is optional.

When the first, second and third pneumatic supports 204, 206, 208 are employed, the power drive unit 200 is also operably coupled to a first pneumatic inflation unit 210, a second pneumatic inflation unit 212 and a third pneumatic inflation unit 214 via the wiring loom 202, the first, second and third pneumatic inflation units 210, 212, 214 being operably coupled to the first, second and third pairs of pneumatic supports 204, 206, 208, respectively. The first, second and third pneumatic inflation units 210, 212, 214 respectively comprise a first pneumatic reservoir 216, a second pneumatic reservoir 218 and a third pneumatic reservoir 220 to store pneumatic fluid. In this example, the first, second and third pneumatic supports 204, 206, 208 are air springs. In some examples, the air springs can be formed from a bellows structure. Of course, as already mentioned above, in another example single pneumatic supports can be employed. In such an example, the first, second and third pneumatic reservoirs 216, 218, 230 can respectively serve the single pneumatic supports employed. In other examples, the use of single pneumatic supports or pairs of pneumatic supports for each lower control arm 116, 148, 160 can share a common pneumatic reservoir or a number of common pneumatic reservoirs.

In a further example, a vehicle simulator system comprises the motion platform apparatus 100 and can optionally comprise the base stage 102 rotatably mounted on the motion stage platform 190. The vehicle simulator system can also optionally comprise the surge-sway motion stage system mentioned above.

In any event, the power drive unit 200 is operably coupled to a processing resource 222 via a data bus 224. The processing resource 222 can be a stand-alone computing apparatus, which can be application specific or a programmed general purpose computing apparatus. In other examples, the processing resource 222 can be a distributed system, where the processing capability can be distributed over more than one processing apparatus, optionally located at different locations. In this example, the processing resource 222 is a server rack executing software to implement the vehicle simulator system. Any suitable operating system can be employed, for example but not exclusively, Linux™ or Windows™.

The processing resource 222 is operably coupled to a data store, for example a storage device 226 or a bank of storage devices, which can be hard drives, digital memory or any combination thereof. The storage device 226 stores, for example, configuration data concerning one or more vehicles to be simulated, including performance and/or handling characteristics of the vehicles to be simulated. The storage device 226 can also store data concerning one or more driving terrains, including visual data, geospatial data and data to enable views from a simulator cockpit to be rendered. In this regard, it should be appreciated that the simulator cockpit is disposed upon the payload platform 134 of the vehicle simulator system. The skilled person will appreciate that other data can be stored by the storage device 226, but as the type of data stored is not core to an understanding of the examples set forth herein, the content of the storage device 226 will not be described in further detail.

The processing resource 222 is operably coupled to a display driver system 228, the display driver system 228 being operably coupled to a display output system 230, for example projectors and a panoramic screen for projection thereon of a simulated environment, the screen being disposed within a field of view of a driver located on the payload platform 134 when part of a vehicle simulator system. The display driver unit 228 is, in this example, also operably coupled to cockpit instruments 232, for example a graphical dashboard display and side and rear-view mirror simulator displays (not shown).

The processing resource 222 is also operably coupled to an audio output system 234 for providing a driver with simulated audio in connection with simulated motion of the simulated vehicle. The processing resource 222 is also operably coupled to an input processing unit 236, the input processing unit 236 being operably coupled to, for example, a so-called simulator pedal unit 238, a simulator gear shifter 240 and a simulator steering wheel 242. Of course, the skilled person will appreciate that other input devices can be provided in the cockpit.

Figure 5:
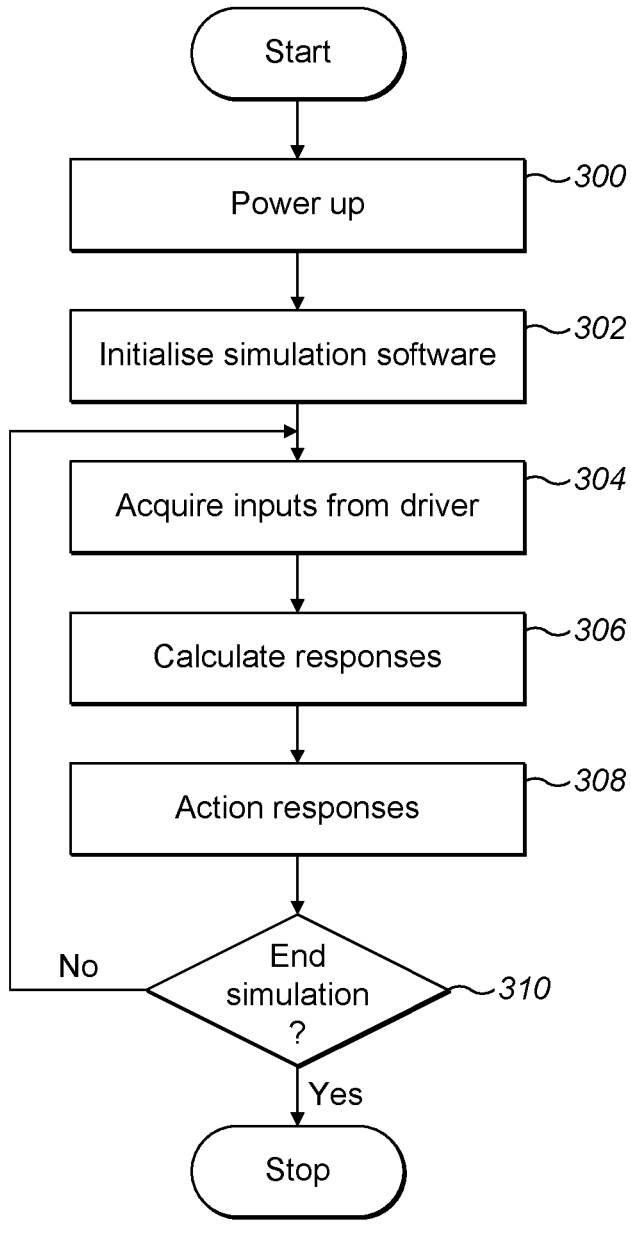
FIG. 5 is a flow diagram of a method of displacing a payload platform constituting another embodiment of the invention.

Referring to FIG. 5, in operation, the motion platform apparatus 100 including the control system of FIG. 4 is powered up (Step 300) and the software for controlling the motion platform apparatus 100 is launched and initialised (Step 302). A driver can enter the cockpit disposed on the payload platform 134 either before or after power up and initialisation of the software (Steps 300 and 302). Once the software has been initialised (Step 302), the driver can begin to operate the driving simulation system as a driver. In other examples, the simulated vehicle can be driven by the simulation system, a passive human passenger residing in the cockpit for the duration of the simulation, for example: to experience a replay of a previously recorded driving sequence, to be driven by an autonomous driving controller, and/or to conduct research into the human perception of different motions. However, in the present example, the control system is configured to acquire inputs (Step 304) from actions performed by the driver, for example as provided through the input devices, such as the simulator pedal unit 238, the simulator gear shifter 240 and the simulator steering wheel 242. Upon receiving one or more inputs via the input processing unit 236, the processing resource 222 calculates (Step 306) responses in terms of controlling the motion platform apparatus 100 and then provides control commands to the power drive unit 200 in order for the responses to be performed (Step 308) by the first linkage 110, the second linkage 112 and/or the third linkage 114, the rotatable base stage 102 and/or the first pair of pneumatic supports 204, the second pair of pneumatic supports 206 and/or the third pair of pneumatic supports 208. Further details of the calculation and actioning of responses is described hereinbelow with reference to FIG. 6.

Following performance of the response(s), the processing resource 222 determines (Step 310) whether an instruction has been received to terminate the simulation. In the event that no termination instruction has been received, the processing resource 222 continues (Steps 304 to 310) to perform the above-described steps until such time as an instruction to terminate the simulation has been received whereupon the processing resource 222 terminates the simulation.

Although not described, the skilled person will appreciate that the processing resource 222 also manages and coordinates other outputs, for example in the form of audible and visual responses. However, as these aspects are not core to an understanding of the operation of the motion platform apparatus 100, for the sake of clarity and conciseness of description, they will not be described further herein.

Turning to FIG. 6, operation of the first, second and third linkages 110, 112, 114 and the rotatable base stage 102 will now be described. For the sake of simplicity and clarity of description, and so as not to detract from the salient aspects of the examples set forth herein, the operation will be described without reference to any use of the surge-sway motion stage system described above.

As will be appreciated, control of the first, second and third linkages 110, 112, 114 and the rotation of the base stage 102 is independent. As such, control of the linkages 110, 112, 114 and the base stage 102 occurs in parallel.

In relation to the linkages 110, 112, 114, based on a model of a vehicle being simulated, the processing resource 222 engages in multiple processing stages that ultimately result in movement of the cockpit residing on the motion payload platform 134. For example, when a drive actively interacts with the simulation system, prior to movement reaching the stage of energising electric motors to move the payload platform 134 in a desired manner, the processing resource 222 uses a physics model of the vehicle being simulated and inputs from the driver and simulated terrain in order to determine motion of the vehicle. In this regard, the physics model provides, over time, sets of accelerations describing the motion of the simulated vehicle. A motion cue filter (not shown) uses each set of accelerations output by the vehicle physics model in order to determine a set of accelerations to be provided by the motion platform apparatus 100 so that the driver perceives the accelerations calculated by the physics model. As such, the processing resource 222, implementing the motion cue filter, calculates (Step 400) the movement in 3 degrees of freedom that the cockpit has to undergo in order to respond to motion cues derived from input from the driver using the input devices mentioned above and the simulated driving environment. The processing resource 222 then calculates (Step 400) the corresponding movements required by one or more of the linkages 110, 112, 114, and thus actuation of one or more of the motors 172, 174, 176 to achieve the required cockpit motion. The processing resource 222 generates one or more control commands (Step 402) and communicates the one or more control commands to the power drive unit 200. The power drive unit 200 then sends (Step 404) actuation control signals to the one or more of the motors 172, 174, 176 that need to move. Thereafter, in response to the actuation control signal(s), the motor 172, 174, 176 associated with each of the linkages 110, 112, 114, respectively, actuates (Step 406).

Depending upon the motor 172, 174, 176 actuated and direction of actuation, the output shafts 133, 153, 167 of the first, second and/or third gearboxes 130, 154, 166 rotate the first, second and/or third lower control arms 116, 148, 160 in a revolute manner respectively, thereby causing the linkages 110, 112, 114 to raise or lower (Step 408) and thus the respective peripheral elevation site 136, 138, 140 to raise or lower. By way of further example with reference to the first motor 172, actuation of the first gearbox 130 results in the first output shaft 133 of the first gearbox 130, which is constrained to rotational movement, to rotate in a clockwise or anticlockwise direction (depending upon the instructed direction to the first motor 172), which results in revolute motion of the first lower control arm 116 about the longitudinal axis of the first output shaft 133 owing to the constraint of the revolute joint 132. The second and third motors 174, 176 are equally capable of affecting such movement in respect of the second and third linkages 112, 114. As can be seen, the first, second and third peripheral elevation sites 136, 138, 140 can therefore be raised or lowered independently as required by the processing resource 222 under the control of the vehicle simulation software. In this regard, elevation and lowering of each of the first, second and third elevation sites 136, 138, 140 by the first, second and third linkages 110, 112, 114 is selective. The movement of the first, second and third linkages 110, 112, 114 to raise and lower selectively the first, second and third peripheral elevation sites 136, 138, 140 enables roll, pitch and/or heave to be applied to a payload, for example the simulator cockpit, disposed upon the payload platform 134.

Of course, the skilled person should appreciate that the above-described example, where the lower control arms 116, 148, 160 are secured to respective output shafts of a transverse motor/gearbox arrangement, is not the only manner of elevating the lower control arms 116, 148, 160. For example, a motor and gearbox arrangement can be directly attached to the lower control arms 116, 148, 160, or in another example a pushrod arrangement can be employed whereby a motor and gearbox act through a linkage mechanism attached to each of the lower control arms 116, 148, 160 in order to form a bell-crank arrangement.

In relation to yaw movements, yaw movement is calculated in a like manner to that described above in relation to heave, roll and/or pitch movements based upon output of the physics model and the motion cue filter to obtain the required movements in 4 degrees of freedom, which are then used to calculate (Step 410), inter alia, yaw movement required of the rotatable base stage 102 (the logical motion control), which is provided (Step 412) as a stream of position demands delivered in real time to the power drive unit 200 in terms of the work to be performed by the yaw table motor and gearbox unit 192. The power drive unit 200 responds to receipt of the yaw command(s) by generating and sending (Step 414) a rotation actuation signal to the yaw table motor and gearbox unit 192. Thereafter, in response to the rotation actuation signal, the yaw table motor and gearbox unit 192 associated with rotation of the base stage 102 actuates (Step 416). Operation of the motor of the yaw table motor and gearbox unit 192 in accordance with the rotation actuation signal results in the motor and gearbox unit 192 rotating (Step 418) the base stage 102 in the manner required by the processing resource 222. The payload platform 134 and thus the cockpit being carried by the payload platform 134 therefore undergoes the rotational movement applied to the base stage 102.

Figure 7:
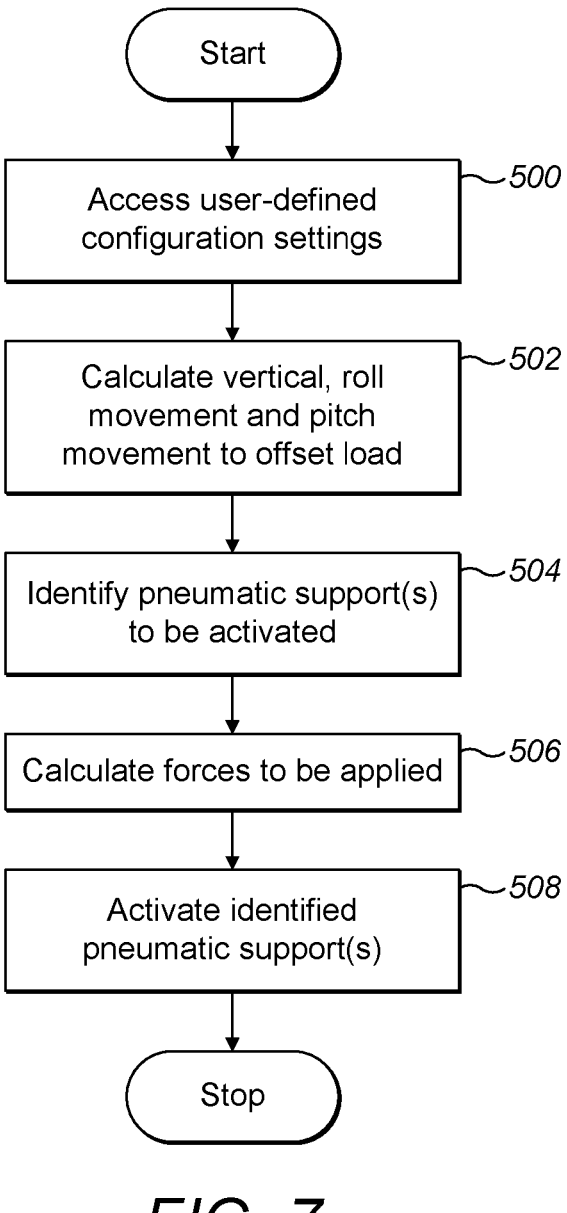
FIG. 7 is a flow diagram of a first method of supporting a payload platform constituting a further embodiment of the invention.

Referring to FIG. 7, the cockpit weight due to gravity must be continually reacted with a vertical force. Furthermore, the centre of gravity of the cockpit (not shown) attached to the payload platform 134 is rarely adequately centred with respect to the payload platform 134 and this will cause a roll moment and pitch moment which must also be continually reacted. As such in this example, prior to operation, the amount the centre of gravity of the cockpit is offset with respect to the payload platform 134 is measured and stored in the storage device 226. Other implementations are possible and will be described later herein.

Thus, when the simulation software is initialised (Step 302), part of the initialisation process includes, in this example, the processing resource 222 retrieving the user-defined configuration settings (Step 500), which includes the offset information stored in the storage device 226. In this regard, the processing resource 222 supports, in this example, a configurator 246 that retrieves the user-defined configuration settings and calculates (Step 502) the forces that the first, second and third pneumatic supports 204, 206, 208 have to apply in order to compensate for the cockpit weight due to gravity and the offset centre of gravity of the cockpit with appropriate restorative vertical force, roll moment and pitch moment.

Using the calculated restorative forces and moments of pitch and roll, the configurator 246 of the processing resource 222 then identifies (Step 504) which of the first, second and third pneumatic supports 204, 206, 208 need to be set. The configurator 246 also calculates (Step 506) application support forces to be applied by the identified pneumatic supports of the first, second and third pneumatic supports 204, 206, 208. In other examples, the forces to be applied by the first, second and third pneumatic supports 204, 206, 208 or the settings of the first, second and third pneumatic supports 204, 206, 208 can be pre-calculated and constitute the user-defined configuration settings. Indeed, in such examples, the user-defined configuration settings can be calculated as a function of a mass of the payload and a distribution of the mass of the payload with respect to the payload platform 134. Indeed, in another exemplary implementation, where the forces are updated dynamically, the forces can be automatically calculated repeatedly during operation of the apparatus 100.

Once the forces to be applied by each of the first, second and third pneumatic supports 204, 206, 208 have been calculated (Step 506), the configurator 246 instructs the power drive unit 200 to pressurise (Step 508) the first, second and third pneumatic supports 204, 206, 208 so as to apply the calculated forces for each of the first, second and third pneumatic supports 204, 206, 208. In response to the instruction from the processing resource 222, the power drive unit 200 sends control signals to the first pneumatic inflation unit 210, the second pneumatic inflation unit 212 and the third pneumatic inflation unit 214 to inflate the first, second and third pneumatic supports 204, 206, 208, respectively. The first, second and third pneumatic supports 204, 206, 208 therefore apply independently the calculated forces, and so are independently configurable and/or actuatable, thereby reducing the workload of each of the first, second and third, electric motors 172, 174, 176.

In this example, the forces to be applied by the first, second and third pneumatic supports 204, 206, 208 are calculated once and applied once throughout operation of the motion platform apparatus 100 in accordance with the user-defined configuration settings. In this regard, the calculated forces can be calculated manually at start-up of the apparatus 100 or automatically at start-up of the apparatus 100. Furthermore, although in this example, the setting of the first, second and/or third pneumatic supports 204, 206, 208 is automatic, the manually or automatically calculated forces can be applied by manual setting of the first, second and/or third pneumatic supports 204, 206, 208. In another example, the forces applied by the first, second and third pneumatic supports 204, 206, 208 can be calculated automatically and varied dynamically during operation of the motion platform apparatus 100.

Figure 8:
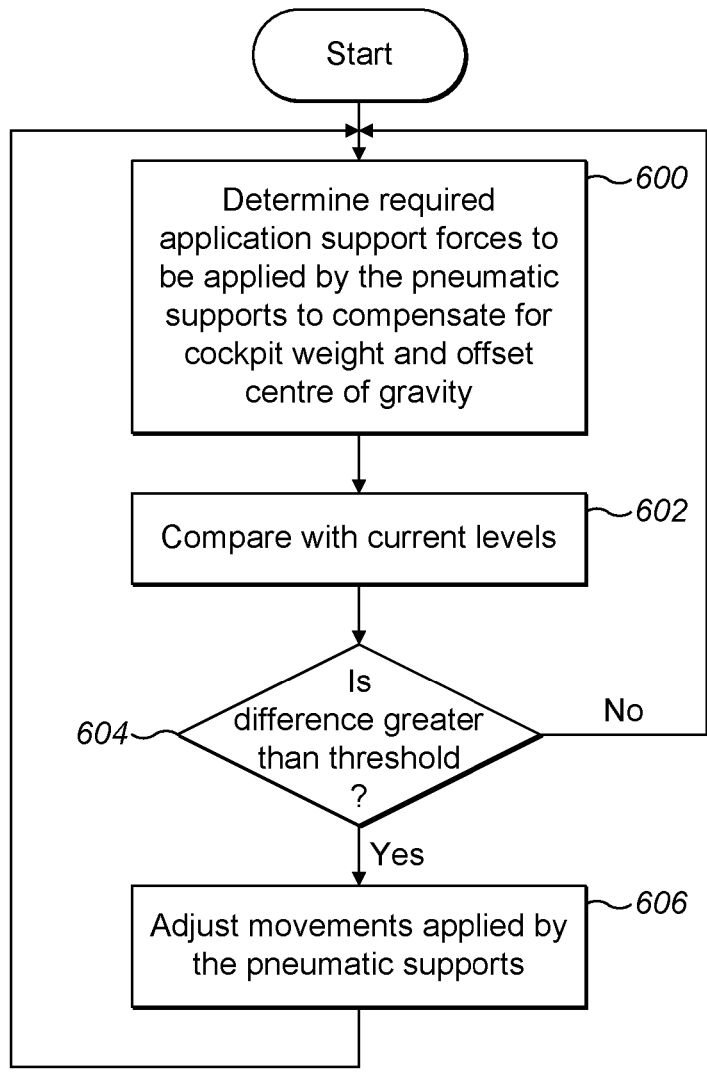
FIG. 8 is a flow diagram of a second method of supporting a payload platform constituting a yet another embodiment of the invention.

In this respect, and referring to FIG. 8, the processing resource 222 then calculates (Step 600) current extensions of the first, second and third linkages 110, 112, 114, and therefore the application support forces required to be applied by the first, second and third pneumatic supports 204, 206, 208 in order to compensate for the cockpit weight due to gravity and the offset centre of gravity of the cockpit with appropriate restorative vertical force, roll moment and pitch moment. The calculated forces are then compared (Step 602) with forces currently being applied by the first, second and third pneumatic supports 204, 206, 208. Predetermined thresholds are set prior to operation in relation to deviation of the forces being applied by the first, second and third linkages 110, 112, 114 from the forces currently being applied by the first, second and third pneumatic supports 204, 206, 208. If the deviation is not greater than the predetermined thresholds (Step 604), the processing resource 222 continues to calculate vertical force and pitch and roll moments and determine whether the forces applied by the first, second and third pneumatic supports 204, 206, 208 need to be adjusted (Steps 600 to 604). However, if the deviation is greater than the predetermined thresholds (Step 604), the processing resource 222 adjusts (Step 606) the forces applied by the first, second and third pneumatic supports 204, 206, 208 to the calculated current required levels (Step 600). In this regard, and as in relation to the preceding example, the processing resource 222 instructs the power drive unit 200 to pressurise the first, second and third pneumatic supports 204, 206, 208 so as to apply the calculated forces for each of the first, second and third pneumatic supports 204, 206, 208. In response to the instruction from the processing resource 222, the power drive unit 200 sends control signals to the first pneumatic inflation unit 210, the second pneumatic inflation unit 212 and the third pneumatic inflation unit 214 to inflate or deflate the first, second and third pneumatic supports 204, 206, 208, respectively. Thereafter, the processing resource 222 continues to calculate vertical force and roll and pitch moments and determine whether the forces applied by the first, second and third pneumatic supports 204, 206, 208 need to be adjusted (Step 600 to 604).

The skilled person should appreciate that the above-described implementations are merely examples of the various implementations that are conceivable within the scope of the appended claims. In this regard, although the above examples assume that each pneumatic support 204, 206, 208 (deployed either as a pair for each lower control arm or as a single support for each lower control arm), has a respective pneumatic reservoir 216, 218, 220 associated with each lower support arm 116, 148, 160, other ways of serving the pneumatic supports 204, 206, 208 are possible depending upon the manner in which the pneumatic supports 204, 206, 208 are used. For example, where the pneumatic supports 204, 206, 208 are set at start-up prior to use, the pneumatic reservoir 216, 218, 220 for each of the pneumatic supports 204, 206, 208 can be connected to a single pneumatic inflation unit via a three-way valve. In another example, a common reservoir can be shared by the pneumatic supports 204, 206, 208, inflation of each pneumatic support 204, 206, 208 being provided by the respective pneumatic inflation units 210, 212, 214. In a further example, each pneumatic support 204, 206, 208 can be served by a respective compressed air supply without the use of an associated reservoir.

Although the above examples describe simulation of a vehicle, it should be appreciated that all aspects of a vehicle need not be simulated, and the vehicle simulation can be in respect of one or more performance aspects of a vehicle. Furthermore, the motion platform apparatus 100 is not intended for exclusive use in land based vehicle simulation and other applications are contemplated, for example amphibious or aeronautical vehicles, or indeed any application in which it is desired to apply motion to a human occupant.

In the examples set forth herein, references to position of any element, such as upper or lower or above or below, are made in the context of the position of the element relative to the ground. However, the skilled person should appreciate that such ground-referenced terms are not intended to be limiting and can be appropriately adjusted where it is possible to orientate the element differently to the ground reference.

The invention claimed is:

1. A vehicle simulation motion platform apparatus comprising:
a payload platform having peripheral elevation sites;

a base stage having peripheral anchoring sites; and
linkages configured to couple the peripheral anchoring sites to the peripheral elevation sites respectively, the linkages comprising a first linkage; wherein
the first linkage comprises a first arm operably coupled at a first end thereof by a spherical joint to a second arm at a first end thereof;
the first arm is operably coupled at a second end thereof to an anchoring site of the peripheral anchoring sites by a first revolute joint;
the second arm is operably coupled at a second end thereof to an elevation site of the peripheral elevation sites by a second revolute joint;
the apparatus further comprises a drive system which has a motor coupled to a paired gearbox arrangement; and
the paired gearbox arrangement comprises a drive shaft that extends between a first side gearbox located at a first side end of the first arm and a second side gearbox located at a second side end of the first arm.

2. The apparatus as claimed in claim 1, wherein the first arm is a first fork.

3. The apparatus as claimed in claim 2, wherein the second arm is a second fork.

4. The apparatus as claimed in claim 3, wherein the first fork is operably coupled to the second fork at respective neck ends thereof.

5. The apparatus as claimed in claim 3, wherein the first fork is a first wishbone and the second fork is a second wishbone.

6. The apparatus as claimed in claim 1, wherein the first linkage is configured to elevate selectively the elevation site.

7. The apparatus as claimed in claim 6, wherein the motor is configured to move the first linkage over a range of extension.

8. The apparatus as claimed in claim 7, wherein the motor is operably coupled to the second end of the first arm.

9. The apparatus as claimed in claim 1, wherein the linkages further comprise:
a second linkage comprising a third arm operably coupled at a first end thereof to a fourth arm at a first end thereof, the third arm being operably coupled at a second end thereof to another anchoring site of the peripheral anchoring sites; and
the fourth arm is operably coupled at a second end thereof to another elevation site of the peripheral elevation sites.

10. The apparatus as claimed in claim 9, wherein the linkages further comprise:
a third linkage comprising a fifth arm operably coupled at a first end thereof to a sixth arm at a first end thereof, the fifth arm being operably coupled at a second end thereof to a further anchoring site of the peripheral anchoring sites; and
the sixth arm is operably coupled at a second end thereof to a further elevation site of the peripheral elevation sites.

11. The apparatus as claimed in claim 1, further comprising:
a turntable comprising the base stage.

12. The apparatus as claimed in claim 1, further comprising:
a translation stage linearly translatable in two substantially perpendicular directions, the motion platform apparatus being operably coupled to the translation stage.

13. A vehicle simulator system, the system comprising:
the on platform apparatus as claimed in claim 1.

14. The system as claimed in claim 13, further comprising:

a display disposed within a field of view;

a processing resource operably coupled to the display and the motion platform apparatus; wherein the processing resource controls operation of the motion platform apparatus, thereby simulating a performance aspect of a vehicle.

15. A method of displacing a payload platform of a vehicle simulator, the method comprising:

coupling a first end of a first arm to a first end of a second arm by a spherical joint;

coupling a second end of the first arm to a peripheral anchoring site of peripheral anchoring sites of a base stage by a first revolute joint;

coupling a second end of the second arm to a peripheral elevation site of peripheral elevation sites of the payload platform by a second revolute joint; and selectively actuating the coupled first and second arms to elevate the peripheral elevation site using a drive system which has a motor coupled to a paired gearbox arrangement, wherein the paired gearbox arrangement comprises a drive shaft that extends between a first side gearbox located at a first side end of the first arm and a second side gearbox located at a second side end of the first arm.

\* \* \* \* \*